United States Patent [19]

Funatsu et al.

[11] 4,107,674
[45] Aug. 15, 1978

[54] COLLISION AVOIDANCE SYSTEM FOR AIRCRAFTS

[75] Inventors: Chuhei Funatsu, Yokahama; Toshikiyo Hirata, Samukawa, both of Japan

[73] Assignee: Toyo Tsushinki Kabushiki Jaka Toyo Communication Equipment Co. Ltd., Kawasaki, Japan

[21] Appl. No.: 714,335

[22] Filed: Aug. 13, 1976

[30] Foreign Application Priority Data

Aug. 15, 1975 [JP] Japan .................. 50-99674

[51] Int. Cl.² .............................. G01S 9/56
[52] U.S. Cl. ................ 343/6.5 R; 343/112 CA
[58] Field of Search ........ 343/6.5 R, 6.5 LC, 112 CA

[56] References Cited

U.S. PATENT DOCUMENTS

| 3,750,168 | 7/1973 | Schrader | 343/112 CA |
| 3,757,324 | 9/1973 | Litchford | 343/6.5 R |
| 3,772,691 | 11/1973 | Hansen | 343/6.5 R |

Primary Examiner—S. C. Buczinski

[57] ABSTRACT

A collision avoidance system for aircraft in which one aircraft is equipped with an interrogation station having a secondary surveillance radar. Coarse distance measurement is effected either by passive or active distance measurement or by both of them. If the detected distance lies within a certain limit, the output power and/or period of the interrogation signal of the secondary surveillance radar of the subject aircraft is altered so as to effect fine distance measurement. This system can be applied without increasing interference against the existing secondary surveillance radar system by keeping the output power and period of interrogation signal in a minimum required extent. By the same reason the system can keep the interference at a small extent between proximate aircraft, each mounting this collision avoidance system.

11 Claims, 4 Drawing Figures

COLLISION AVOIDANCE SYSTEM FOR AIRCRAFTS

BACKGROUND OF THE INVENTION (1) Field of the Invention

The present invention relates to a distance measurement system for collision avoidance of aircraft. The system is to prevent aircraft collision by suitably providing, for instance, a threat signal depending on a result of measurement of mutual distance between proximate or approaching aircraft in flight should danger of collision occur.

(2) Description of the Prior Art

According to recent development of air traffic, the danger of collision between aircraft has been increased very much because more and more large numbers of various aircraft take the air of same area and same altitude within the same time zone. Therefore it is a very important to establish and maintain safe navigation of aircraft. There are provided ground radar units mainly for the air traffic control purposes. But it would cost an enormous amount to establish a safe navigation control system using only such ground radar. In addition a number of technical difficulties must, yet be solved in realizing such a system. Furthermore, such a control system is not effective outside the range of the ground radar.

The conventional distance measurement system including that using a secondary surveillance radar of a subject aircraft may be classified into two major systems, i.e., a passive system and an active system.

A passive distance measurement system is a system based on a principle of measurement of incoming information only. In this system, a radar beam from a ground station functioning as a secondary surveillance radar and air traffic control (ATC) transponder outputs of the subject aircraft and of other nearly, i.e. threatening aircraft delivered in response to the ground secondary surveillance radar are utilized for identifying the distance between the two aircraft.

In more detail this system is mainly based on the measurement of a time difference between an ATC transponder output of the subject aircraft delivered in response to a ground secondary surveillance radar beam of a ground station and an ATC transponder output of the other nearby aircraft delivered in response to the same ground radar beam.

The passive system is further based on the following facts.

(1) The locus of the points at which the above time difference becomes constant takes the form of ellipsoid having the subject transponder antenna and the ground antenna as the focuses.

(2) ATC transponders of the subject and the other aircraft can only receive the ground radar beam when the two aircraft are covered by an effective radiation pattern from the ground radar beam.

(3) The transmitting wave strength of an ATC transponder is a certain value decided by regulation so that the reception wave strength of the ATC transponder output of other aircraft can be used to represent a function of distance between the two aircraft.

This passive distance measurement system has certain disadvantages.

In the system of deducing the distance by obtaining the above time difference, there will be no time difference when the second aircraft is located on a line connecting the subject aircraft and the ground antenna or comes very close to said line. In this case the time difference becomes same as the time required for the response to the transmission of the ATC transponder from the second aircraft irrespective of the distance between the second aircraft to the subject aircraft.

To assume the distance between aircraft, by the level of received wave strength set forth above (3) also has a certain danger. Because the electric field strength of the ATC transponder of the second aircraft may not have a constant value and it may vary depending on the course and attitude of flight of the second aircraft mainly by a reason of non-uniformity of the transmission pattern of the antenna of the ATC transponder.

An active distance measurement system overcomes most of the abovementioned disadvantages of the passive system. In an active distance measurement system, the ground station and its transmission radar beam pattern are not utilized, but the collision avoidance system on the subject aircraft is given the facility of transmitting an interrogation signal acting as a kind of secondary surveillance radar. By measuring the time difference between the transmission of the interrogation signal and reception of a response signal delivered from the ATC transponder of the second aircraft responding thereto by the collision avoidance system of the subject aircraft, the distance between the two aircraft can be obtained. This active distance measurement system affords a substantially high accuracy in the distance measurement compared with the passive distance measurement system.

It is preferred to arrange the transmission of the secondary surveillance radar, in the active distance measurement system equipped on an aircraft, during an interval of scanning of the ground radar beam, which has a very sharp directivity. By the above arrangement, the influence of the transmitted signals of the subject and other aircraft to the ground station can be minimized. The applicants had disclosed abovementioned arrangement in Japanese Patent Application Publication No. 29,358/73. There is also a possibility that both the subject and the threatening aircraft are navigating in a zone where no ground radar exists. In such a case, the secondary surveillance radar on the aircraft may be arranged to transmit the interrogation signal at a certain time interval irrespective of the existence of other approaching aircraft.

In the active distance measurement system, since a highly accurate distance measurement is possible, the system may be modified to have a function of measuring the variation of the abovementioned time difference. In this case mutual speed of the two aircrafts can be obtained without much difficulty and this would contribute in avoiding collision.

Thus the active distance measurement is a much improved system compared with the passive distance measurement system, however, this system has still disadvantages substantially mentioned below.

(1) Fruit noise of an overall radar system may be increased by the interrogation of the secondary surveillance radar which is mounted on the aircraft and by the response signal thereto.

(2) During the interrogation and response between the subject aircraft and the other or threatening aircraft aircraft, the ATC transponder on the second aircraft becomes insensitive for the further interrogation and therefore the function of the secondary surveillance radar is spoiled.

In order to avoid aforementioned disadvantages of the active distance measurement system either of the following two steps must be taken;
(a) decrease the number of interrogation signals from the subject aircraft.
(b) suppress radiation power of the interrogation signal.

SUMMARY OF THE INVENTION

The present invention has its primary object the provision of a system mitigating the aforementioned disadvantages of both the passive and the active systems.

Another object of the invention is to establish a distance measurement system for collision avoidance of the aircrafts by supplying, for instance, an alarm or threat signal, without applying any particular requirement such as, for instance, mounting additional equipment on the threatening aircraft but just using the secondary surveillance radar function already in use on an aircraft and the ATC transponder with which aircraft are usually equipped.

The present invention is a system in which both features of the passive and the active distance measurement systems are combined. In accordance with the system of the present invention the aforementioned disadvantages of the existing two systems are avoided by automatically altering either the interrogation period or the transmitting power of the interrogation wave of the subject aircraft depending on an identified distance between it and the threatening aircraft obtained by either of the passive or active system or a combination thereof.

The present invention utilizes the existing ATC transponder for collision avoidance, however, the system of the invention is so arranged as not to give any interference to the existing ground secondary surveillance radar systems.

DESCRIPTION OF THE PREFERRED EMBODIMENTS

Figure 1:
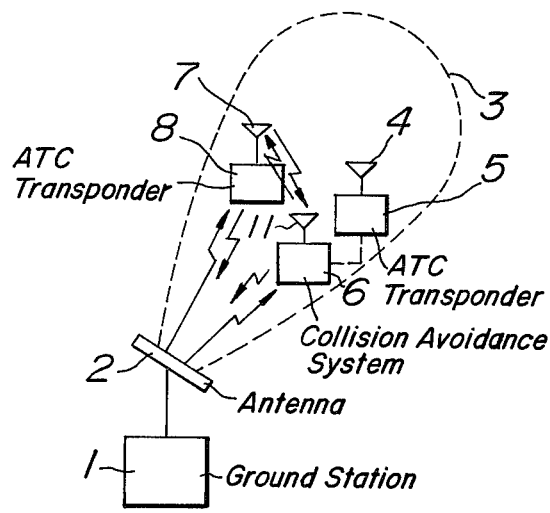
FIG. 1 is a schematic diagram for explaining the principle of the passive and active distance measurement systems using a secondary surveillance radar system.

In order to first give a clear understanding of the present invention, existing passive and active distance measurement systems will be explained by referring to the drawings.

In FIG. 1, a ground interrogation station 1 having the function of a secondary radar system for air traffic control purposes is coupled to an antenna 2 for radiating an interrogation radar beam. The radar beam is transmitted with a sufficient directional characteristic and is arranged to scan a certain given area.

By the transmission of the radar beam from the directional antenna 2, a zone 3 is defined at a certain instance having its wave intensity exceeding a certain level, for instance, higher than a respondable level of the ATC transponder The transmitted radar beam from the antenna 2 is received by an ATC transponder 5 mounted on the subject aircraft through an antenna 4. The ATC transponder 5 transmits a response signal after a certain short time delay from the reception of the interrogation signal. The response signal is transmitted through the antenna 4.

In this case the aircraft is also provided with a collision avoidance system 6. In FIG. 1, it is assumed that there is another aircraft in the neighborhood of the first or subject aircraft and this second aircraft is also provided with an ATC transponder 8 and its antenna 7.

The interrogation radar beam having the directional characteristic shown by 3 is also received by the ATC transponder 8 of the second aircraft which delivers a response signal after a certain time through the antenna 7. The antenna 7 has generally a non-directional characteristic so that the response signal is received by the collision avoidance system 6 through its own antenna 11 to which system 6 the response signal delivered by the first ATC transponder 5 is also supplied.

Figure 2:
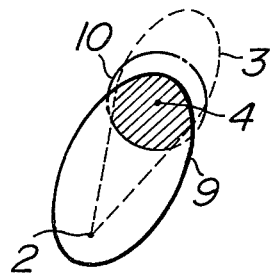
FIG. 2 is a diagram for explaining the principle of the passive distance measurement system.

The locus of a point at which the time difference identified by the system 6 between the one response signal delivered from the first ATC transponder 5 and other response signal delivered from the other ATC transponder 8 becomes constant is given by an ellipsoid 9 as shown in FIG. 2 having two focuses one being that of the first antenna 4 and the other being that of the ground antenna 2. By using the time difference an approximate distance between the two aircrafts can be obtained. In this case it is assumed that the antenna 4 and the system 6 are located in very close proximity.

The instance wherein both the ATC transponders 5 and 8 can receive the same ground interrogation wave is when the two aircraft are located in the same radiation pattern 3 of the ground radar beam.

By measuring the field intensity of the response signal of the ATC transponder 8, which must deliver a certain constant level, an approximate distance between the two aircraft can be deducted.

Namely in the passive distance measurement system, either the time difference between the first ATC transponder response signal and the second ATC transponder response signal or the field intensity of the received second ATC transponder response signal is used to identify the distance between the two aircraft.

In an active distance measurement system, the ground station 1, the antenna 2 and the radiation pattern 3 are not used but the collision avoidance system 6 on the subject aircraft is given a function of transmitting interrogation signal of the secondary surveillance radar system. The time difference between the transmission and the reception of the response signal from the ATC transponder 8 on the second aircraft is used for measuring the mutual distance of the two aircraft.

A basic principle of the system of the present invention will now be explained by taking up some possible embodiments.

EMBODIMENT 1

In one embodiment of the present invention, an interrogation wave of 30 Watt peak to peak (P—P) output level is transmitted from the collision avoidance system 6 mounted on the first aircraft. This interrogation signal will provide an electric field strength that any ATC transponder of an aircraft located within 5 NM (nautical mile) can respond thereto.

The interrogation period is adjusted to be 3 seconds interrogation. The abovementioned output power and the period are the minimum requirement for avoiding collision for aircraft having speed less than 1 Mach in view of probability. By selecting the above values, the increase in disturbance ratio to the existing secondary radar system by fruit noise or the like is less than 2%. Furthermore, the increase of the insensitivity ratio of the existing ATC transponder can be kept less than 4.5%. Therefore, it can be said that the system of the present invention does not affect either the function of the existing secondary radar system or that of the ATC transponder.

By using passive distance measurement, if the collision avoidance system 6 detects the second aircraft within a range of 10 NM as for instance by the reception of a response signal from the second aircraft exceeding -60 dBm, the system 6 automatically increases the transmitting output of the interrogation signal to a level of 300 watts and thus expands the surveillance range to 10 NM. Also the interrogation period is lengthened to 12 seconds.

The abovementioned output power and the period are the sufficient values to avoid collision of aircraft having speed less than 1 Mach in view of probability. Furthermore, the extent of the influence to the existing secondary surveillance radar and to the existing ATC transponder is very minor and is in the same degree as mentioned above.

The increase of the output power of the interrogation signal and the elongation of the interrogation period are continued until the distance between the aircrafts reaches 13 NM by passive or active distance measurement or combination thereof. At this distance of 13 NM there is no substantial danger of collision.

For the period when the distance obtained by active measurement is 5.5 NM to 3.5 NM, the interrogation period is automatically altered from 12 seconds to 3 seconds linearly and consecutively. By using active distance measurement by its one interrogation, the next interrogation period is thus decided automatically. The system 6 is so modified to include such function. During this period the passive distance measurement is continued to establish the backing up of the active distance measurement.

At a range of less than 4.5 NM by active distance measurement, the output power of the interrogation wave is decreased to 30 Watt. This output power is returned to 300 Watt, when the distance becomes over 5 NM and the period is lengthened to 12 seconds.

According to the abovementioned embodiment 1, the first aircraft is protected by active measurement by its secondary surveillance radar having output of 30 Watt and interrogation period of 3 seconds. In the present system, the active distance measurement is automatically adjusted in its interrogation frequency and power output by using passive distance measurement in conjunction with the ground surveillance radar and the occurrence of fruit noise and the system disturbance are suppressed to very minor level.

It is evident that the embodiment 1 is altered to change either one of the output power or the interrogation period which still has a good collision avoidance facility. It may be imagined easily that the alteration of output power and the period can be effected by either one of the passive or active distance measurement.

Altitude Information

Altitude information is included in a response signal of an ATC transponder for responding to a particular kind of interrogation signal so that it is easy to detect an altitude difference between aircrafts by using passive or active distance measurement.

Accordingly, it is possible to derive the altitude difference signal by arranging the interrogation signal of the secondary radar equipment on the first aircraft to contain such particular requirement. Furthermore, by arranging the behavior of alteration of the transmission power and the period by referring also the detected altitude difference, it is possible further to suppress the aforementioned disturbance effect against existing secondary surveillance radar system, accompanied with the introduction of this system, without decreasing the collision avoidance effect.

The required devices or circuits to be added to the system 6 for realizing this function are minor ones.

Approaching Speed

Particularly in the active distance measurement system, the approaching speed between first aircraft and other aircraft can be obtained with substantial accuracy by effecting the distance measurement consecutively.

It is obvious that approximate approaching speed can be obtained by the passive distance measurement.

The system disturbance can be effectively decreased further, by introducing controls for the interrogation output power and the interrogation period by using the information of the approaching speed in addition to the distance and altitude information.

EMBODIMENT 2

The distance deduction by using the passive and/or active distance measurement requires a complicated calculation process. A calculation to obtain three dimensional approaching speed including the altitude factor becomes more complicated. If the apparatus is to have added a function to control transmission output power and period of the interrogation signal level and of indicating alarm to a suitable value, then the apparatus must be a bulky one for instance to include a microprocessor.

Figure 3:
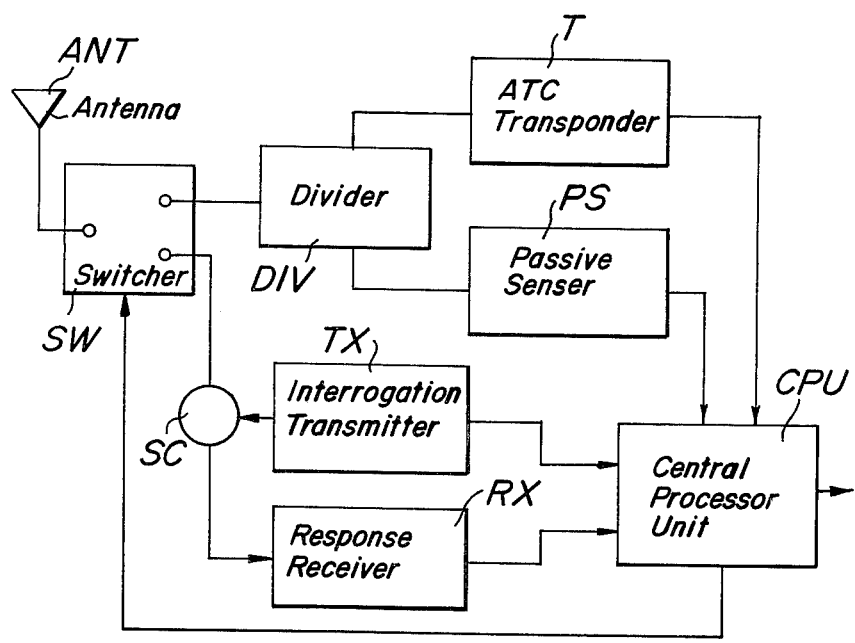
FIG. 3 is a block diagram of an inventive apparatus equipped on the subject aircraft for collision avoidance.

FIG. 3 shows a block diagram of one embodiment of the collision avoidance system to be mounted on an aircraft. In this embodiment, an antenna ANT is commonly used by an ATC transponder T corresponding to the ATC transponder 5 of FIG. 1 and the other portions of the diagram which correspond to the collision avoidance system 6 shown in FIG. 1.

The signal received by the antenna ANT is fed through a switcher SW and a divider DIV both to the ATC transponder T and to a passive sensor PS. The ATC transponder T responds to the incoming signal and transmits a response signal through the same route in reverse direction. The output of the ATC transponder T and the output of the passive sensor PS are supplied to a central processor unit CPU. The central processor unit CPU has further connection to an interrogation transmitter TX, a response receiver RX and to the switcher SW. The result of passive distance measurement, active distance measurement, altitude information, approaching speed information and other information are processed under certain mutual relationships by the central processor unit CPU. According to the result of the above process the output power and period of the interrogation signal, kind of threat signals and others are decided displayed and used as further instructions. The device designated by SC is a directional coupler such as a circulator.

The program to be stored in the central processor unit CPU should be one to effectively decrease the fruit noise and system disturbance at a possible minimum extent under consideration of any encountering conditions. Generally a most suitable program is decided by effecting a simulation test.

EMBODIMENT 3

Figure 4:
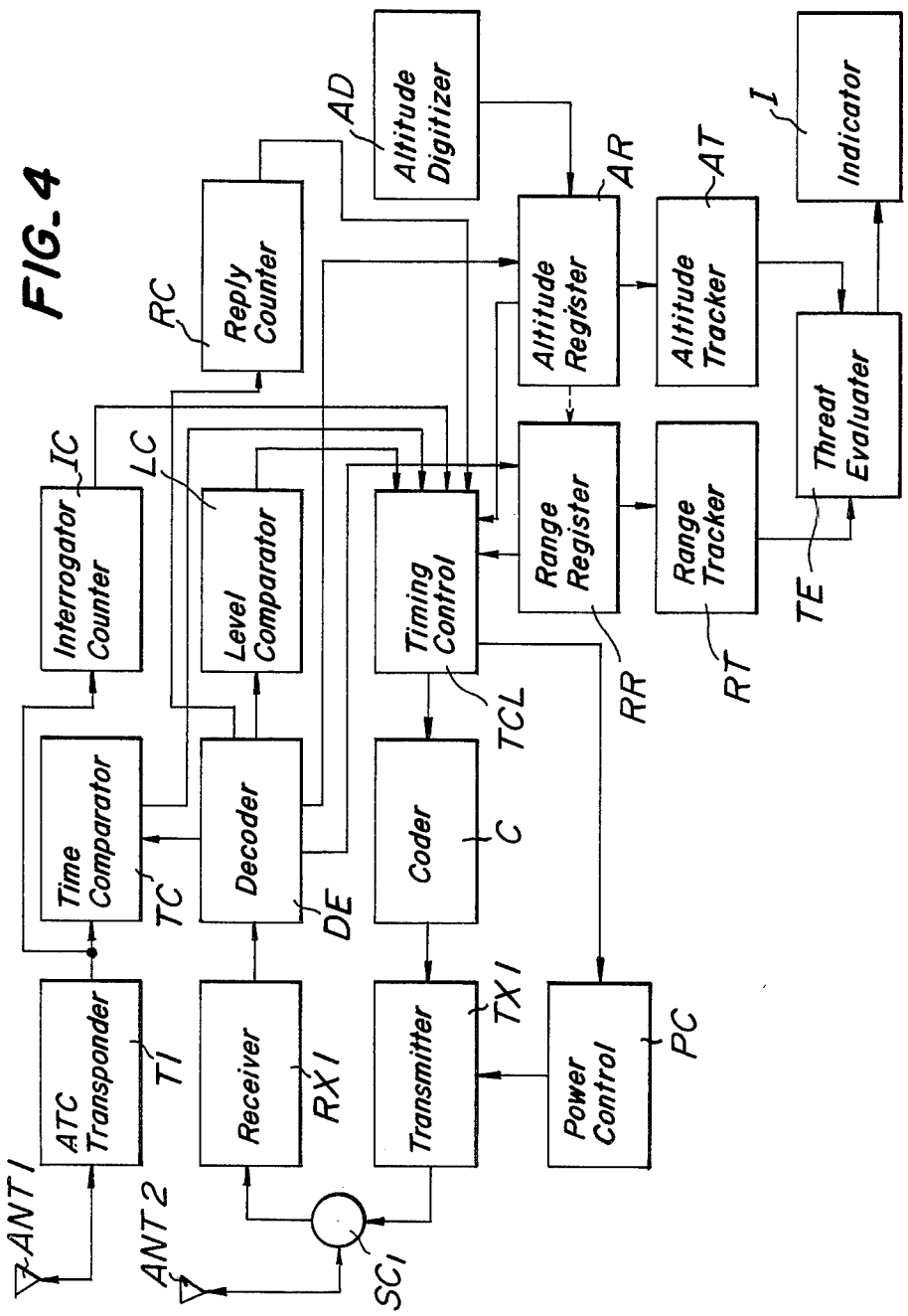
FIG. 4 is a more detailed block diagram of the apparatus shown in FIG. 3.

FIG. 4 shows a block diagram of another embodiment of the system according to the present invention to be mounted on the aircraft.

An interrogation signal sent from a ground station acting as a secondary surveillance radar, such as shown in FIG. 1 by the station 1, is received by an antenna ANT1 corresponding to antenna 4 of FIG. 1. The received signal is fed through an ATC transponder T1 to a time comparator TC. On the other hand, a response signal sent from an ATC transponder of the second aircraft corresponding to the transponder 8 of FIG. 1 and received by an antenna ANT2, which corresponds to the antenna 11 of FIG. 1, is fed to the time comparator TC through a receiver RX1 and a decoder DE. The time difference between the former and the latter signals can be derived by the time comparator or time counter TC. If this time difference is less than 120 $\mu$S for instance, a signal is sent from the time comparator TC to a timing control TCL. One output of the timing control TCL is fed to a transmitter TX1 through a coder C, and another output of the timing control TCL is fed to the same transmitter TX1 through a power control PC. Under control of the TCL the transmitter TX1 transmits an interrogation signal of for instance 12 second period and of 300 W output power through the antenna ANT2.

It the time difference between the two signals obtained by the time comparator TC exceeds 120 $\mu$S, then the interrogation signal is changed to have 3 second period and 30 W output power.

The response signal of the ATC transponder of the second aircraft corresponding to the transponder 8 of FIG. 1 received by the antenna ANT2 and the receiver RX1 and decoded by the decoder DE is on the one hand supplied to a level comparator LC. If the response signal is over −60 dBm, a signal is sent from the level comparator LC to the timing control TC and an interrogation signal same as before and for instance having 12 second period and 300 W output is transmitted through the antenna ANT2.

If the response signal level is less than −60 dBm, the interrogation signal is changed to have 3 second period and 30 W output power. An output of the ATC transponder T1 is further supplied to an interrogation counter IC and counted the number of the interrogation signals. If the number of interrogation signals is less than 100 during a period of 12 second for instance, a signal is derived from the interrogation counter IC to the timing control TC and an interrogation signal having 12 second period and 300 W output power is transmitted through the antenna ANT2 same as mentioned before.

Also in this case if the number of signals is more than 100 during 12 second period, the interrogation signal is changed to have 3 second period and 30 W output power.

The response signal of the ATC transponder of the second aircraft responding to the interrogation signal sent from the antenna ANT2, is received by a receiver RX1 and sent to a decoder DE and decoded therein.

An output signal of the decoder DE is supplied to a range register RR and the mutual distance from the other aircraft is obtained therein.

In this case if the obtained mutual distance is less than 5 NM for instance, the interrogation signal transmitted from the antenna ANT2 is changed to have 3 second period and 30 W output power. This is controlled by an output signal delivered from the range register RR to the timing control TC which controls power control PC and the coder C and eventually transmitter TX1.

Another output signal from the range register RR is sent to a range tracker RT and the relative speed between the aircraft is obtained thereat. Output signal of the range tracker RT is sent to a threat evaluator TE. The danger of collision with other aircraft is evaluated by the threat evaluator TE and instruction is given to an indicator IN if a danger of collision is evaluated.

A further output signal of the decoder DE is fed to an altitude register AR. By using the decoded signal and an output signal from an altitude digitizer AD representing altitude of the own aircraft, the relative altitude between other aircraft can be obtained.

By using the abovementioned relative altitude information, if the relative altitude is less than ±3,400 ft for instance, the variation rate of the relative altitude is obtained by using the altitude tracker AT. By using the output signal thereof, the threat evaluator TE evaluates the danger of collision between other aircraft and sends an instruction signal to an indicator IN to send an alarm or a threat signal if a signal is supplied already by the range tracker RT.

If the relative altitude is more than ±3,400 ft for instance, the threat evaluator TE does not send an output even though the range tracker RT sent an output signal to the threat evaluator TE. It is also possible that this altitude difference information is supplied to the range tracker RT as shown by dotted line so that the interrogation output power and period are not changed even when the detected distance is small.

The system of the present invention will give a substantially improved effect for collision avoidance and its influence for the existing secondary radar system can be kept at a very minor extent.

This system has also an advantage that the interference between the collision avoidance systems mounted on several aircrafts can be kept at a small extent by the same reason set forth above.

Accordingly, the invention may contribute for the safe navigation for the more and more increasing air traffic.

What is claimed is:

1. A collision avoidance system for aircraft each equipped with an ATC transponder comprising;
    an interrogation station mounted on one aircraft, having secondary surveillance radar function emitting an interrogation signal to be responded to by the ATC transponder of a second aircraft,
    coarse detection means on said one aircraft for detecting the existence of the second aircraft in proximity to said one aircraft, and
    output control means for altering at least one of output power and transmission period of the interrogation signal so as to effect fine detection of said second aircraft when said coarse detection means delivers a signal representing information concerning said second aircraft which exceeds a certain value.

2. The collision avoidance system for aircraft as claimed in claim 1, wherein said coarse detection means deduces the distance between the aircraft by detecting the time difference between reception of a second interrogation signal sent from a ground secondary surveillance radar at said one aircraft and a response signal sent from the ATC transponder mounted on said second aircraft in response to said second interrogation signal.

3. The collision avoidance system for aircraft as claimed in claim 1, wherein said coarse detection means deduces distance between the aircraft by detecting the time difference between transmission of an interrogation signal sent from the interrogation station mounted on said one aircraft and a response signal sent from the ATC transponder mounted on said second aircraft in response to said interrogation signal.

4. The collision avoidance system for aircraft as claimed in claim 1, wherein said coarse detection means deduces the distance between the aircraft by detecting the receiving level of a response signal sent from the ATC transponder mounted on said second aircraft responding to an interrogation signal sent from a ground interrogation station.

5. The collision avoidance system for aircraft as claimed in claim 1, wherein said coarse detection means deduces the altitude difference information between the aircraft by detecting altitude information included in the response signal delivered from the ATC transponder of the second aircraft.

6. The collision avoidance system for aircraft as claimed in claim 1, wherein said coarse detection means deduces the variation of altitude difference between the aircraft by consecutively deducing altitude difference information.

7. The collision avoidance system for aircraft as claimed in claim 1, wherein the output control means for altering at least one of output power and transmission period of the interrogation signal sent from the interrogation station functions in response to detected variation of time difference between transmission of the interrogation signal and reception of the response signal.

8. The collision avoidance system for aircraft as claimed in claim 1, wherein the output control means functions in response to detection of the repetition frequency of the response signals, i.e. number of responses during a certain duration, sent from the ATC transponder on the second aircraft.

9. The collision avoidance system for aircraft as claimed in claim 1, wherein said output control means functions in response to detection of repetition frequency of interrogation signals sent from ground secondary surveillance radar, i.e. number of second interrogation signals during a certain duration.

10. Collision avoidance system as claimed in claim 5, wherein the response signal of the other aircraft is sent in response to an interrogation signal sent from the interrogation station mounted on said one aircraft.

11. Collision avoidance system as claimed in claim 6, wherein the response signal of the other aircraft is sent in response to an interrogation signal sent from the interrogation station mounted on said one aircraft.

* * * * *